Sept. 16, 1969          E. HAAS          3,466,807

DEVICE FOR MACHINING IRREGULARLY CURVED SURFACES

Filed Sept. 1, 1966          4 Sheets-Sheet 1

INVENTOR

Eberhard Haas

BY Bailey, Stephens + Huettig

ATTORNEYS

Sept. 16, 1969   E. HAAS   3,466,807
DEVICE FOR MACHINING IRREGULARLY CURVED SURFACES
Filed Sept. 1, 1966   4 Sheets-Sheet 2

INVENTOR
Eberhard Haas

BY Bailey, Stephens + Huettig
ATTORNEYS

Sept. 16, 1969   E. HAAS   3,466,807
DEVICE FOR MACHINING IRREGULARLY CURVED SURFACES
Filed Sept. 1, 1966   4 Sheets-Sheet 3

INVENTOR
Eberhard Haas

BY Bailey, Stephens + Huettig
ATTORNEYS

INVENTOR
Eberhard Haas

BY Bailey, Stephens + Huettig
ATTORNEYS

United States Patent Office 3,466,807
Patented Sept. 16, 1969

3,466,807
DEVICE FOR MACHINING IRREGULARLY
CURVED SURFACES
Eberhard Haas, Heilbronn (Neckar), Germany, assignor to August Lapple GmbH. & Co., Heilbronn (Neckar), Germany, a company
Filed Sept. 1, 1966, Ser. No. 576,584
Claims priority, application Germany, Sept. 3, 1965, L 51,547
Int. Cl. B24b 19/00
U.S. Cl. 51—60
10 Claims

ABSTRACT OF THE DISCLOSURE

A grinding tool is carried on the end of a piston rod the piston of which is pivoted on a horizontally movable sleeve to which is also pivoted another piston whose piston rod is pivoted to the first piston. Another piston has its rod connected to the first piston and is pivoted on a second sleeve mounted above the first sleeve, the second sleeve being also movable horizontally. Both sleeves are mounted on threaded spindles carried by a vertically movable frame, which in turn is mounted on threaded vertical spindles carried by a stationary frame, and all driven by a single motor.

In a modified form, the grinding tool is supported from a frame movable on wheels having a seat for an operator. In a further form, a grinding tool is carried by a frame mounted on wheels running on rails on a main frame, this main frame being shiftable on rails.

BACKGROUND OF THE INVENTION

Field of the invention

The invention relates to a method for machining irregularly curved surfaces, for example, on plungers, matrices, blank-holders or other shaped parts of large tools, and more particularly to a method by which the machining is effectuated by grinding by means of a grinding wheel or the like, and especially to a method for producing a so-called cross-grinding finish on the surface to be machined. The invention relates further to a device for executing this new method.

The prior art

The machining of irregularly curved surfaces, edges, profiles, or the like, on parts of the kind in question here, particularly by the production of a so-called cross-grinding finish on the surface to be machined, has in the past been performed manually by drawing grinding stones or grinding wheels with a large working surface by hand over the work-piece, firstly in one direction and then at right angles thereto, wherein particular care had to be taken that no grooves developed and that no irregularities were produced which could be detected later in the polished surface of the plunger. This manual work is tedious and tiring and naturally requires a great deal of time. The use only of machanically driven portable grinders or vibration grinders—so to speak as a hand-operated instrument to be drawn over the surface to be treated—is not suitable for the purpose in question here, since valleys or grooves can easily be produced thereby because the working surface of the instrument is not uniform and cannot be drawn over the surface of the work-piece at an even speed.

SUMMARY OF THE INVENTION

It is an object of the present invention to provide a method of the general character described which on the one hand helps to avoid the tiring manual work and on the other hand creates the possibility of quicker and more accurate work.

Another object of the invention consists in creating a new method which is characterized in that a working movement, which is automatically and appropriately controlled hydraulically or pneumatically and which may be linear and traversing at the same time or is rotating and reciprocating, is imparted to the grinding head, grinding stone or the like in its holder alternately at a certain adjustable angle to the longitudinal mean axis of the object being machined and at right angles thereto at certain intervals of time within a working cycle, and at the same time a translatory movement, which gradually advances roughly linearly from an initial position corresponding to one end of the object or workpiece to the other end and/or back which runs at an even speed along the contour and advantageously roughly at right angles to the longitudinal mean axis of the object or work-piece being treated, and which is also automatically controlled, is imparted to the holder of the grinding wheel or grinding stone, and furthermore, between the individual working cycles, on the one hand the holder of the grinding stone is appropriately returned quickly to the respective initial position for the translatory movement, and on the other hand the relative position between the object or work-piece to be treated and the holder for the grinding stone or grinding wheel is progressively changed from one end of the object or work-piece to the other in a direction at right angles to the translatory movement by a distance corresponding at most to the respective stroke of the working movement, and finally, between the individual working cycles or within the cycles, the angular position of the grinding stone or grinding wheel in relation to a vertical and/or horizontal plane is appropriately varied by hand or by remote control as a function of the shape of the surface to be treated.

Yet another object of the invention consists in creating a new method with which an extremely great saving in time may be achieved and with which a third to a fifth of the time previously required to improve the quality of the surface may be sufficient.

A further object of the invention consists in creating a method with which a perfectly machined surface is guaranteed.

A still further object of the invention consists in providing a device of the beforementioned character which is characterised by the fact that it has a holder for the grinding stone or grinding wheel, consisting of a preferably double-acting pneumatic or hydraulic working cylinder with a reciprocating piston guided in the cylinder to perform the working movement, and with a swivel attached to the piston and to the end of the piston rod carrying the grinding stone or grinding wheel projecting out of the cylinder, as well as with a control valve to control the piston movement, appropriately attached to the working cylinder, supported on the frame of the device and displaceably guided on the frame or with the frame to perform the translatory movement.

Another object of the invention consists in providing a device of the aforesaid kind with which the holder for the grinding stone or grinding head can, for example, rest on an adjusting sleeve with an internal thread, whose longitudinal mean axis runs at right angles to the longitudinal mean axis of the working cylinder of the holder, and which is supported on a threaded spindle with a horizontal longitudinal mean axis surrounding it from outside in a coaxial arrangement which is supported on the frame, immovable in an axial direction but rotatable, and which has an associated drive, for example, in the form of an electric motor.

Yet another object of the invention consists in providing a device of the general character described with which the holder for the grinding stone or grinding wheel can however, for example, also be suitably arranged on a roughly vertical column, its height being adjustable, the column resting on a carriage-like or sledge-like base, which moves in a direction at right angles to the working movement to perform the translatory movement, and extending upwards from the base.

A further object of the invention consists in creating a device of the kind specified with which the holder for the grinding stone or grinding wheel can, for example, also be arranged, its height being adjustable, at the bottom end of a roughly vertical column which is carried by a sliding carriage, hanging downwards appropriately from it, the carriage being supported on a carrier to move roughly at right angles to the direction of the working movement, the supports of which are arranged on both sides of the grinding stone and can move backwards and forwards on a base advantageously roughly in the direction of the working movement.

A still further object of the invention consists in providing a device which makes the execution of the new method in a mechanical manner possible with a simple construction with adjustments possible in every conceivable direction.

Another object of the invention consists in providing a device of the kind in question with which besides the customary grinding stones, so-called vibration grinders or portable grinders, inserted accordingly in the holder, can also be used as the tool for treating the surface to be machined and with which in the same way one can also use electro-chemical or spark-erosion abrasion-electrodes, which can be inserted in the same way and which fulfill the same purpose.

BRIEF DESCRIPTION OF THE DRAWINGS

These and other objects, features, and advantages of the present invention will become further apparent from the following detailed description thereof, particularly when the same is read with reference to the accompanying drawings in which there are shown specific embodiments of devices for the execution of the new method. More in particular.

DESCRIPTION OF THE PREFERRED EMBODIMENTS

Figure 1:
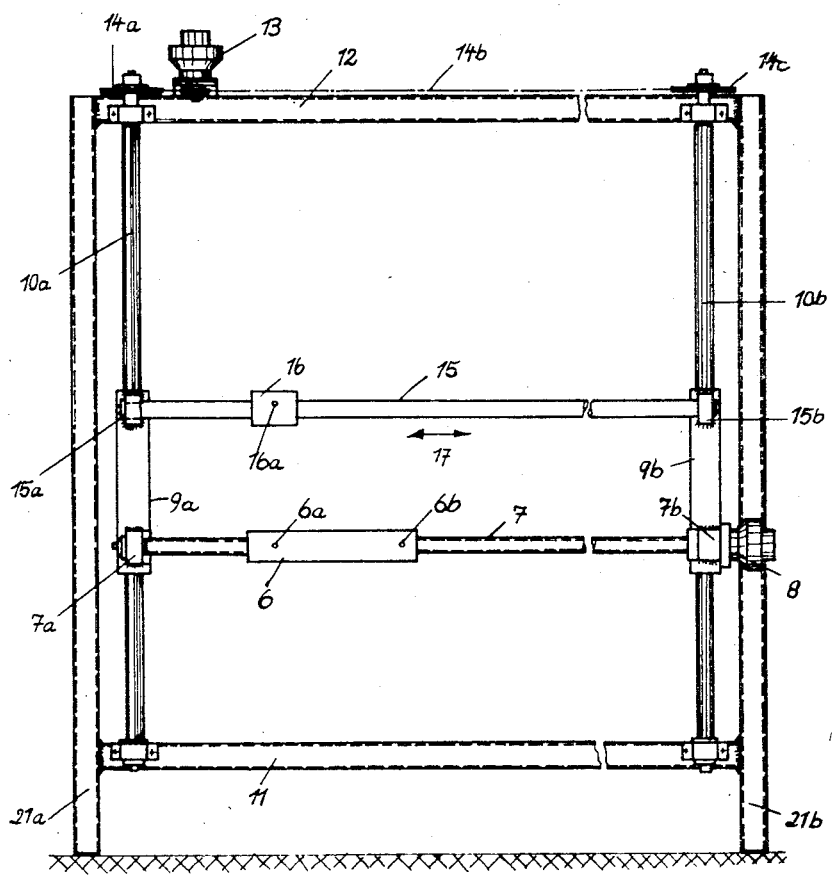
FIGURE 1 is a front view of a first constructional form of the device according to the invention for executing the new method.
Figure 2:
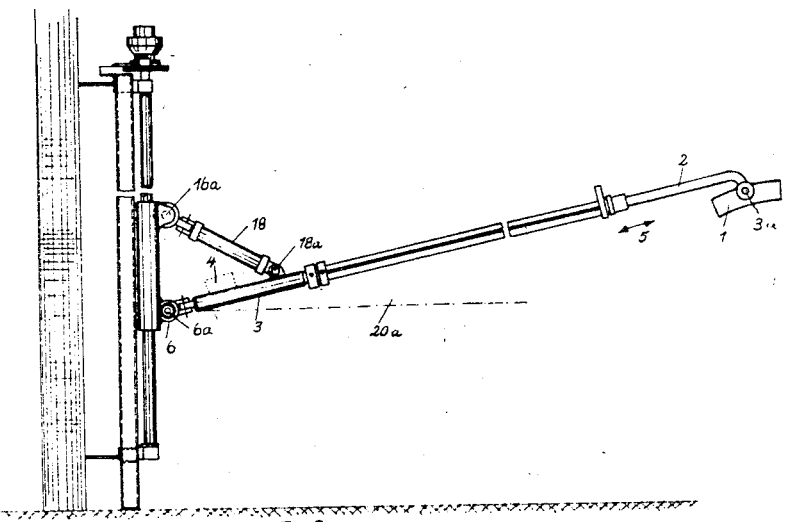
FIGURE 2 is a side view of the device in FIGURE 1.
Figures 3, 4:
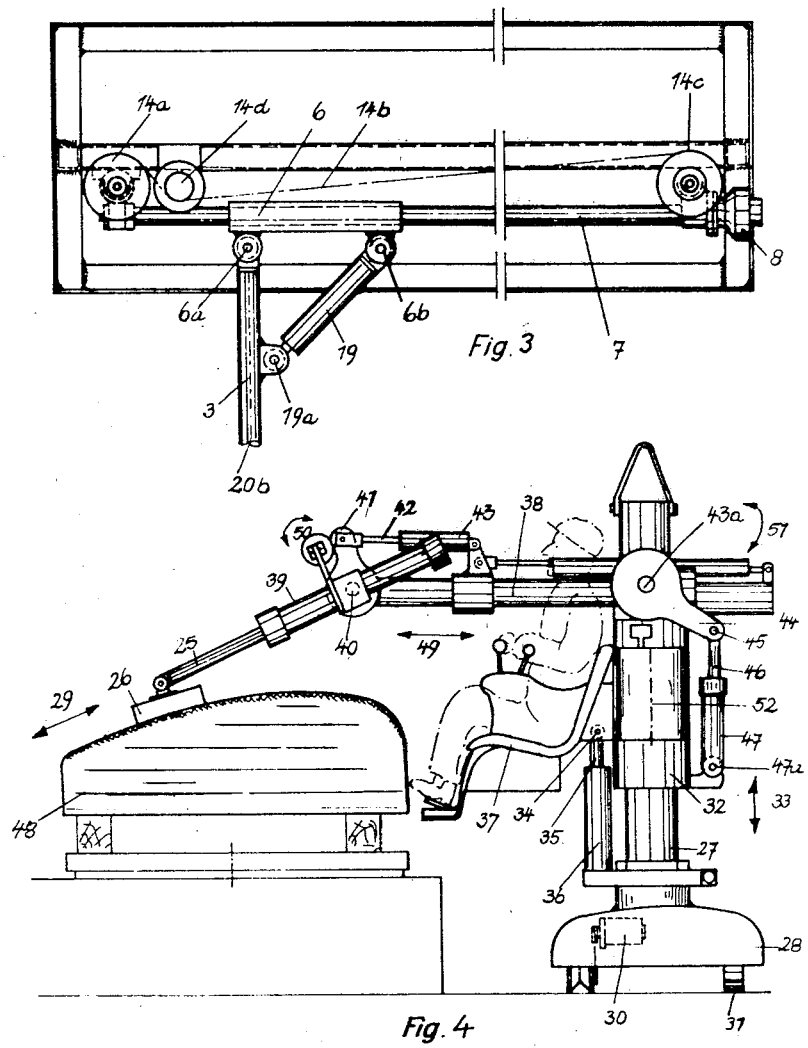
FIGURE 3 is a partially-reproduced plan-view of the device in FIGURE 1.
FIGURE 4 is a diagrammatically-represented side view of a modified constructional form of the subject of the invention.

In FIGURES 1, 2 and 3 of the drawings the grinding stone for machining the surface to be treated is denoted by 1, and it is seated in a holder 2 in such a way that it can be swivelled about the horizontal axis 3a. The grinding stone can also be so arranged on its holder 2 by means of a universal joint, so that it can be swivelled both about a horizontal and a vertical axis. Finally, instead of a grinding stone, a portable vibrator or the like can also be used. The holder 2 is guided in a pneumatic cylinder 3 as a piston rod and serves as the holder of the grinding stone by carrying the grinding stone at its free end. The necessary control valve can be attached to the control cylinder, for exmaple at 4 (dotted line). The working movement is produced backwards and forwards in the direction of the arrow 5. The pneumatic cylinder 3 is pivoted at 6a on the adjusting sleeve 6, which has an internal thread and is supported on the threaded spindle 7 with a longitudinal mean axis running horizontally and at right angles to the longitudinal mean axis of the working cylinder. The spindle 7 is supported on the frame of the device, immovable in an axial direction but rotatable, and is driven by the electric motor 8. A hydraulic driving motor can also be provided. The bearings 7a, 7b of the threaded spindle rest on height-adjustment sleeves 9a, 9b, which are supported on vertical threaded spindles 10a, 10b, whose ends are supported on the horizontal cross-pieces 11, 12 of the frame of the device, the spindle being immovable in an axial direction but rotatable. The vertical threaded spindles 10a, 10b are driven through the chain gearing 14a, 14b, 14c, 14d by the electric motor 13, which is jointly alloted to them as motive power. The vertical sleeves 9a, 9b carry in their lower regions the ends 7a, 7b of the threaded spindle, and in their upper regions at 15a, 15b the ends of a non-rotatably mounted horizontal shaft 15 running parallel to the threaded spindle 7. On this shaft 15 is guide backwards and forwards in the direction of the arrow 17 a sleeve 16, at the outer-periphery of which, at 16a, is hinged one end of a pneumatic adjustment cylinder 18, in which is guided a reciprocating piston and piston rod, and whose free end projecting out of the cylinder is flexibly connected at 18a to the free end of the working cylinder 3 of the holder facing the grinding stone, the other end being hinged at 6a to the horizontal sleeve. At the adjusting sleeve 6 is also hinged at 6b at an axial distance from 6a one end of a further pneumatic adjustment cylinder 19, in which is guided a reciprocating piston and piston rod, the free end projecting out of the cylinder being flexibly connected at 19a to the working cylinder 3 of the holder. The movements of the pistons in both adjustment cylinders 18, 19 can be manually controlled, e.g., by corresponding valves attached to the cylinders, so that in this way the angular position of the holder 2 in relation to the horizontal plane 20a and the vertical plane 20b (FIGURE 3) can be adjusted.

The frame of the device also includes two vertical carriers 21a, 21b, anchored to the floor and/or to a wall, and at least carrying the drive motor 8 for the translatory movement, while the horizontal traverses 11, 12 already mentioned appropriately carry the drive motor 13 for the height adjustment.

In the arrangement in FIGURE 4 the holder 25 for the grinding stone 26 is mounted on a roughly vertical column 27 resting on a sledge-like or carriage-like construction 28 which can be moved in a direction at right angles to the direction of the working movement according to arrow 29. The drive for this carriage-like or sledge-like construction comes from an electric or hydraulic motor 30, and the base can be moved backwards and forwards, e.g., on rollers, possibly on profiled rollers with corresponding rails. The vertical column 27 can be rotatably mounted on the base about a vertical axis 52 coinciding with its longitudinal mean axis, whereby a motor or a pneumatic or hydraulic swivel cylinder can also act as the drive. The holder 25 for the grinding stone is fastened to a ring 32 which can move up and down on the column 27 as indicated by the arrow 33; at 34 the free end of a piston rod 35, which belongs to a piston which is guided in the cylinder 36, acts movably up and down on the ring. The ring 32 in an advantageous manner also carries the seat 37 for the operator, who from this comfortable position can control all the movements of the device. The ring 32 finally also carries an expediently double-acting pneumatic or hydraulic advancing cylinder 38 which guides a reciprocating piston whose piston rod carries at its free end the cylinder 39 of the holder 25 for the grinding stone 26. This cylinder is rotatably supported at 40 on the advance cylinder 38 in accordance with arrow 50. To the working cylinder 39 is firmly connected a lever arm 41, to the projecting end of which is hinged the free end of a piston rod 42, which belongs to a piston which reciprocates in the pneumatic or hydraulic operating cylinder 43, whose reciprocating movement runs at right angles to the axis of rotation of the swivelling working cylinder 39 and parallel to the longitudinal mean axis of the carrying part 38. The cylinder 38 is in its turn at 43a rotatably hinged to the ring 32 in accordance with the arrow 51 and is connected to a lever arm 44, to which at 45 is hinged the free end of a piston rod 46, whose piston reciprocates, in the cylinder 47 hinged to the ring 32 at 47a in a vertical direction as indicated by arrow 33, i.e., at right angles to the axis of rotation 43a and parallel to the longitudinal mean axis of the ring 32. The ring can moreover be swivelled on the column about the vertical longitudinal mean axis. In this way not only a movement in a vertical direction in accordance with arrow 33, but also an adjusting movement in a horizontal direction in accordance with arrow 49, a swivelling movement in the direction of arrow 50, as well as a swivelling movement in the direction of arrow 51, and finally also a swivelling movement about the vertical axis 52 can be produced for the machining of the workpiece 48. The actual working movement of the grinding stone is indicated by the arrows 29.

Figure 5:
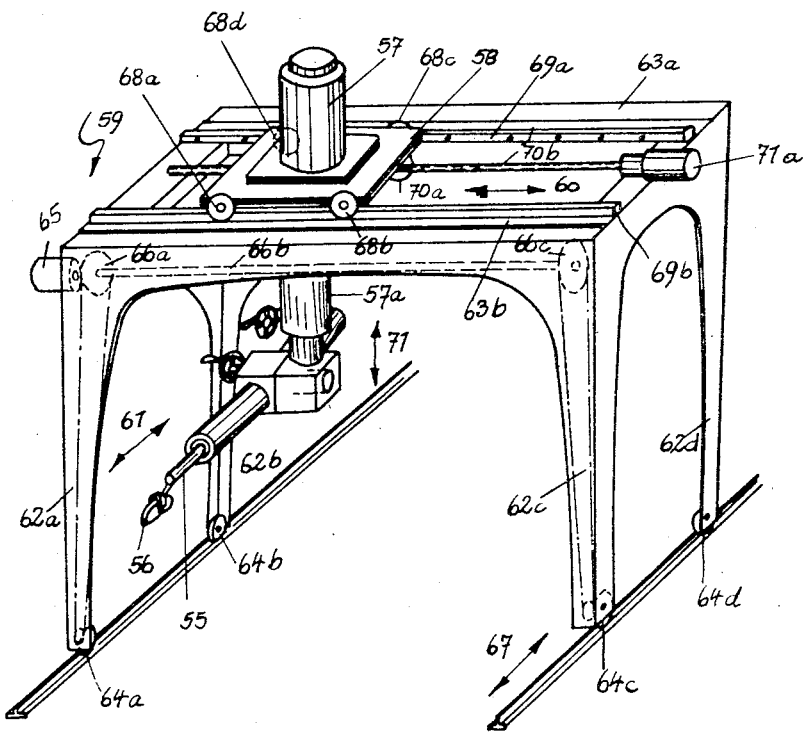
FIGURE 5 is a front view in perspective of a third constructional form of the invention.

In FIGURE 5 is shown a further constructional form of the device in accordance with the invention. In this case the holder 55 for the grinding stone 56 is mounted at the bottom end of a roughly vertical column 57, which is carried by a sliding carriage 58, which is supported on a portal-like carrier 59 and can be moved backword and forwards in the direction of the arrow 60. The working movement is produced in the direction of the arrow 61. The portal-like carrier has four roughly vertical supporting columns 62a, 62b, 62c, 62d, which are arranged on both sides of the grinding stone at points corresponding roughly to the corners of a rectangle, which carry at their upper ends a frame 63a, 63b which acts as a guide for the sliding carriage 58, and which are supported at their bottom ends by rollers 64a, 64b, 64c, 64d with a horizontal rotational axis, and of which at least one, and advisably two, is or are driven by the electric motor 65 via the gearing 66a, 66b, 66c. In this way, besides the working movement in accordance with arrow 61 and the adjustment movement at right angles thereto in accordance with arrow 60, an adjustment movement of the entire portal-like carrier in accordance with arrow 67 is also effected. The sliding is in its turn supported on four rollers 68a, 68b, 68c, 68d, which run backwards and forwards on the guide rails 69a, 69b in accordance with arrow 60. At its underside the carriage carries a nut 70a, through which is passed a threaded spindle 70b, which runs parallel to the guide rails and is supported on the portal-like carrier, immovable axially but rotatable, with the electric motor 71a acting as the drive. The vertical column 57 is rotatably mounted on the carriage about a vertical axis, whereby a revolving piston engine, for example, can serve as the drive. On it is supported a cylindrical body 57a, which can be adjustable upwards and downwards in a vertical direction in accordance with arrow 71, and whose movement can, for example, be produced by means of a hydraulic working cylinder and a piston guided therein, and which carries at its bottom end the holder for the lever. The load on the vertical column is additionally relieved by an air cylinder or counterweight. In this case, besides the working movement of the grinding stone with direction in accordance with arrow 61, there is produced an adjustment movement in accordance with arrow 67 of the entire portal-like carrier, an adjustment movement in accordance with arrow 60 of the carriage and grinding stone, furthermore an adjustment movement of the holder in a vertical direction in accordance with arrow 71, as well as a swivelling movement about the vertical axis of the column, the horizontal axis of the articulated head and the axis of the cylinder or holder 55.

It must also be pointed out that in all the constructional forms of the subject of the invention in the drawings the procedure is that a working movement, which runs at a certain adjustable angle to the longitudinal mean axis of the object being machined, is first of all imparted to the grinding stone in its holder within a working cycle, after which, within certain time-intervals, the direction is changed and a movement running at right angles thereto is imparted to the grinding stone. These movements are produced linearly or undulating backwards and forwards, and they are automatically controlled, as a rule, e.g., pneumatically or hydraulically, via a corresponding control panel manually with sensing elements, or according to a programme. At the same time a translatory movement, which advances gradually roughly linearly from an initial position corresponding to one end of the work-piece to the other end and/or back, which runs at an even speed parallel or at right angles to the longitudinal mean axis of the object, and which is also automatically controlled, is imparted to the holder of the grinding stone. Between the individual working cycles the tool is expediently quickly returned to its respective initial position for the translatory movement, and the relative position between the object and the holder can in this case be progressively changed from one end of the object or work-piece to the other in a direction at right angles to that of the translatory movement by a distance corresponding at most to the respective stroke of the working movement. Finally, between the two working cycles or within the cycles, the angular position of the grinding stone in relation to a vertical and/or horizontal plane can also be varied by hand as a function of the shape of the surface to be treated.

Instead of a grinding stone or a portable vibration device, electro-chemical or spark-erosion abrasion-electrode can also be used. The term "grinding head" should be understood as including all these possible versions. One may also, if one wishes, use a hydraulic instead of a pneumatic drive. In suitable cases an electric-motor drive can also be used, just as one may on the other hand in the above described specific embodiments substitute a hydraulic or pneumatic drive for the electric-motor drive provided, if they appear suitable for the purpose.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Apparatus for machining irregularly curved surfaces, comprising a frame, an abrasion member, an arm extending outwardly from the frame in a generally horizontal direction carrying said abrasion member, means mounting the arm on the frame to rock up and down about a horizontal axis transverse to the longitudinal axis of the rod and to swing about a substantially vertical axis, said horizontal axis being movable up and down with respect to the frame in which said arm includes first power-operated means for imparting to the abrasion member a translatory movement in a direction transverse to the longitudinal axis of the arm, whereby said abrasion member can be caused to progress substantially linearly from one end to the other of a workpiece.

2. Apparatus as claimed in claim 1 which said first power-operated means comprises a double-acting fluid-operated abrasion-member positioning cylinder and piston arrangement, and a control valve for said cylinder mounted for translatory movement therewith.

3. Apparatus as claimed in claim 2, wherein the arm is carried by a horizontal adjusting sleeve with an internal thread whose longitudinal axis runs at right angles to the longitudinal axis of the arm, and which is supported on a threaded spindle with a horizontal axis, the horizontal sleeve surrounding the spindle in a coaxial arrangement which is supported on the frame of the device, the spindle being immovable in an axial direction but rotatable.

4. Apparatus as claimed in claim 3, wherein the bearings for the ends of the threaded horizontal spindle rest on height-adjustment sleeves with vertical longitudinal axes, each supported on a vertical threaded spindle, the ends of the vertical spindles being supported on the frame, the vertical spindles being immovable in an axial direction but rotatable, and a common driving motor to which the vertical spindles are connected.

5. Apparatus as claimed in claim 4, wherein the ends of the horizontal threaded spindle are supported in the lower regions of the vertical height-adjustment sleeves, and a horizontal shaft has its ends non-rotatably attached in the upper region of the height-adjustment sleeves, said horizontal shaft running parallel to the threaded horizontal spindle, a sleeve guided on said horizontal shaft freely displaceable in a longitudinal direction, to the outer periphery of which sleeve is hinged one end of a fluid-pressure adjusting cylinder, in which is displaceably guided a reciprocating piston and a piston rod therefor, the free end of said last piston rod projecting out of the cylinder and being flexibly connected to the free end of the cylinder of the abrasion-member positioning arrangement nearest the abrasion member.

6. Apparatus as claimed in claim 4, wherein the means mounting the arm to rock up and down comprises means pivotally connecting the arm to the horizontal adjusting sleeve, and wherein there is also hinged to the horizontal sleeve at an axial distance from said pivotal connecting means one end of a further fluid pressure adjusting cylinder, in which is guided a reciprocating piston and piston rod, the free end of said last piston rod projecting out of the cylinder and being flexibly connected to the cylinder of the abrasion-member positioning arrangement.

7. Apparatus as claimed in claim 2, wherein the arm is arranged with its height adjustable on a substantially vertical column which is seated on a carriage-like base, which can be moved in a direction at right angles to the working movement to perform the translatory movement, from which base the column extends upwards, the arm being fixed to a bearing ring, which can slide up and down on the column and can also rotate on the column about a vertical axis, and with which there engages the free end of the piston rod of a piston which moves up and down in a vertical direction in a fixed double-acting fluid pressure height-adjustment cylinder, also carrying a seat for the operator.

8. Apparatus as claimed in claim 7, wherein the bearing ring which can move up and down on the column carries a double-acting fluid-pressure advance cylinder with a reciprocating piston, whose piston rod carries at its free end on the side facing the workpiece the piston of said abrasion-member positioning arrangement which is arranged on said piston rod and which can swivel on the piston rod about a horizontal axis, one of the fluid pressure height-adjustment and positioning cylinders, which can swivel about a horizontal axis, being firmly connected to a lever arm, to whose projecting free end is pivoted the free end of a piston rod belong to a piston guided in a fluid pressure operating cylinder, the reciprocating movement of which runs at right angles to the axis of rotation of the swivelling positioning cylinder and parallel to the longitudinal axis of the arm.

9. Apparatus as claimed in claim 1, wherein the arm is arranged at the bottom end of a substantially vertical column, the column hanging down from a sliding carriage which moves substantially at right angles to the direction of the working movement, supported by a carrier whose supports are arranged on both sides of the abrasion-member and which can be moved backwards and forwards on a base substantially in the direction of the working movement.

10. Apparatus as claimed in claim 9, where the carrier has four substantially vertical supporting columns arranged at points corresponding substantially to the corners of a rectangle, carrying at their upper ends a frame which acts as a guide for the sliding carriage, and at their bottom ends are supported on rollers which can rotate about horizontal axis, of which at least one roller is driven, and wherein the sliding carriage is supported on rollers guided backwards and forwards on guide rails running at right angles to the direction of the working movement on the carrier, and on its underside the carriage carries a sleeve with an internal thread, through which is passed a threaded spindle running parallel to the guide rails, the spindle being immovably but rotatably supported on the carrier.

References Cited

UNITED STATES PATENTS

| 3,156,072 | 11/1964 | Boehme | 51—35 X |
| 2,441,701 | 5/1948 | Herz. | |
| 2,651,888 | 9/1953 | Comstock | 51—35 X |
| 3,335,525 | 8/1967 | Muehling | 51—35 |
| 1,962,489 | 6/1934 | Elbert | 51—35 X |

FOREIGN PATENTS

| 592,959 | 2/1934 | Germany. |

JAMES L. JONES, JR., Primary Examiner

U.S. Cl. X.R.

51—35